United States Patent Office 2,938,034
Patented May 24, 1960

---

2,938,034

DI-THIOCARBAMYL-PYRIDINES

Francis E. Cislak, Indianapolis, Ind., assignor to Reilly Tar & Chemical Corporation, Indianapolis, Ind., a corporation of Indiana No Drawing. Filed June 10, 1959, Ser. No. 819,219

5 Claims. (Cl. 260—294.8)

This invention relates to new compositions of matter, and to the process of making them. More particularly, it relates to di-thiocarbamylpyridines, which compounds have the general formula:

My new compounds may be conveniently made by the reaction of a dicyanopyridine with ammonium sulfide. The equation below portrays the formation of 3,5-dithiocarbamylpyridine from 3,5-dicyanopyridine:

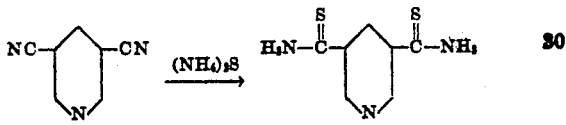

Illustrative of the manner in which my invention may be practiced I cite the following examples.

EXAMPLE 1

*3,5-di-thiocarbamylpyridine*

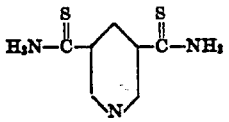

100 grams of 3,5-dicyanopyridine is dissolved in 1000 grams of 30% ammoniacal methanol. The resulting solution is saturated with dry H$_2$S at 25° C. and then permitted to stand at room temperature for about two days. The di-thionicotinamide formed during this time is separated from the mother liquor by filtration. For most purposes the product so obtained is pure enough. If a purer product is desired, it may be obtained by recrystallizing the semi-pure compound from suitable solvents, such as water, water-acetone, pyridine, or dimethylforamide.

The 3,5-dithionicotinamide is a high melting crystalline solid having a yellow color.

EXAMPLE 2

*3,4-di-thiocarbamylpyridine*

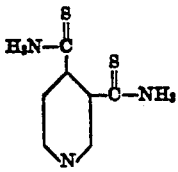

The procedure of Example 1 is repeated except that 3,4-dicyanopyridine is used in place of the 3,5-dicyanopyridine.

EXAMPLE 3

*2,5-di-thiocarbamylpyridine*

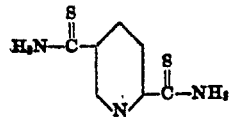

The procedure of Example 1 is repeated with the exception that 2,5-dicyanopyridine is used instead of the 3,5-dicyanopyridine.

EXAMPLE 4

*2,6-di-thiocarbamylpyridine*

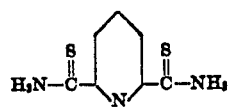

The procedure of Example 1 is repeated with the exception that 2,6-dicyanopyridine is used in place of the 3,5-dicyanopyridine.

EXAMPLE 5

*2,4-di-thiocarbamylpyridine*

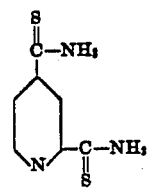

The procedure of Example 1 is repeated with the exception that 2,4-dicyanopyridine is used in place of the 3,5-dicyanopyridine.

My di-thiocarbamylpyridines are useful in controlling the action of non-oxidizing inorganic acids upon metals. A 5% solution of my di-thiocarbamylpyridines in high boiling coal-tar bases is particularly useful in inhibiting the action of dilute aqueous sulfuric acid upon steel.

The behavior of my di-thiocarbamylpyridines indicates that they exist in two tautomeric forms. Thus, 3,5-di-thiocarbamylpyridine, in its reactions, functions as either of the tautomeric forms shown below:

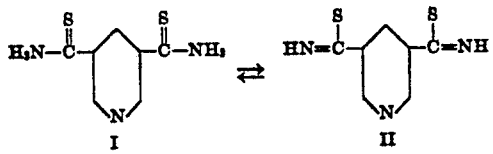

I          II

The presence of two thiol groups in the molecule of my di-thiocarbamylpyridines makes them useful for the preparation of "co-ordination polymers" by treatment with suitable metal salts to form metal derivatives. Such polymerizations may be carried out by chelation with zinc (II), copper (II), and nickel (II) ions. The structure of these polymers is portrayed below:

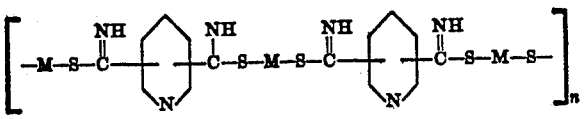

These polymers are characterized by stability at high temperatures.

I claim as my invention:
1. Di-thiocarbamylpyridines having the structural formula:
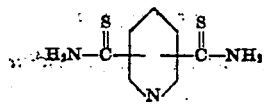
2. The compound 3,5-di-thiocarbamylpyridine.
3. The compound 2,6-di-thiocarbamylpyridine.
4. The compound 2,5-di-thiocarbamylpyridine.
5. The compound 3,4-di-thiocarbamylpyridine.
References Cited in the file of this patent
UNITED STATES PATENTS
| | | |
|---|---|---|
| 2,500,142 | Wiesehahn | Mar. 7, 1950 |
| 2,560,046 | Alliger | July 10, 1951 |
| 2,653,942 | Lee | Sept. 29, 1953 |